(12) United States Patent
Tian et al.

(10) Patent No.: US 10,228,748 B2
(45) Date of Patent: *Mar. 12, 2019

(54) CONTEXT AWARE POWER MANAGEMENT FOR GRAPHICS DEVICES

(71) Applicant: INTEL CORPORATION, Santa Clara, CA (US)

(72) Inventors: Kun Tian, Shanghai (CN); Ke Yu, Beijing (CN); Yao Zu Dong, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,068

(22) Filed: Dec. 9, 2016

(65) Prior Publication Data

US 2017/0090551 A1    Mar. 30, 2017

Related U.S. Application Data

(63) Continuation of application No. 13/977,422, filed as application No. PCT/CN2013/071976 on Feb. 28, 2013, now Pat. No. 9,547,356.

(51) Int. Cl.

| G06F 1/32 | (2006.01) |
| G06F 1/3218 | (2019.01) |
| G06T 1/20 | (2006.01) |
| G06F 9/50 | (2006.01) |
| G06F 9/46 | (2006.01) |
| G06F 1/3293 | (2019.01) |
| G06F 1/3296 | (2019.01) |

(52) U.S. Cl.
CPC .......... *G06F 1/3218* (2013.01); *G06F 1/3293* (2013.01); *G06F 1/3296* (2013.01); *G06F 9/461* (2013.01); *G06F 9/5094* (2013.01); *G06T 1/20* (2013.01); *Y02D 10/22* (2018.01)

(58) Field of Classification Search
CPC .. G06F 1/32218; G06F 1/3293; G06F 1/3296; G06F 9/461
See application file for complete search history.

(56) References Cited

U.S. PATENT DOCUMENTS

| 9,547,356 B2 | 1/2017 | Tian et al. |
| 2008/0074433 A1 | 3/2008 | Jiao et al. |
| 2008/0192063 A1* | 8/2008 | Liao ...................... G06T 15/005 345/582 |
| 2011/0145916 A1* | 6/2011 | McKenzie .............. G06F 21/83 726/19 |
| 2014/0092103 A1* | 4/2014 | Saulters .................. G06F 15/00 345/501 |

(Continued)

FOREIGN PATENT DOCUMENTS

| CN | 101405677 A | 4/2009 |
| CN | 102088472 A | 6/2011 |

OTHER PUBLICATIONS

CN Office Action for CN201380071539.X, dated Dec. 28, 2017, 4 pages.

(Continued)

*Primary Examiner* — Austin Hicks

(57) ABSTRACT

Systems, apparatus and methods are described related to context aware power management for graphics devices.

22 Claims, 9 Drawing Sheets

(56) References Cited

U.S. PATENT DOCUMENTS

2015/0169029 A1    6/2015  Tian et al.

OTHER PUBLICATIONS

Chinese Patent Office First Office Action in Chinese Patent Application No.201380071539.X dated Oct. 18, 2017, 7 pages with Summary of Relevance.
State Intellectual Property Office, P.R. China, China Application No. 201380071539.X, Second Office Action, dated Aug. 1, 2018, 9 pages.
State Intellectual Property Office, P.R. China, China Application No. 201380071539.X, Third Office Action, dated Nov. 5, 2018, 7 pages.

* cited by examiner

CONTEXT AWARE POWER MANAGEMENT FOR GRAPHICS DEVICES

BACKGROUND

Power consumption is a major concern in computing devices and, in particular, in personal computing devices, such as laptops, smartphones, tablets, and ultrabooks, and the like. Further, applications running on the devices increasingly rely on graphics and/or media hardware to accelerate processing. Such applications may be related to productivity, infotainment, web browser, or gaming, or the like. Increased use of graphics and/or media hardware may result in increasing die size and increased power consumption by the graphics device, for example.

To save or better manage power on the graphics device, frequency scaling and/or idle states management may be introduced. The clocks and/or voltages provisioned to the graphics device may be scaled up or down to balance the power and performance requirements and/or part of the graphics circuits may be powered down (e.g., put in a so-called 'idle state') to further reduce power consumption. The actual frequency and/or idle state may be dynamically specified by the graphics driver or decided by the graphics device itself based on guidance information provided from the graphics driver. In some examples, to determine the frequency, idle state, or guidance information to be provided to the graphics device, the graphics driver may use a heuristic algorithm. For example, a power manager of the graphics driver may monitor ongoing commands being dispatched from the graphics driver to the graphics device and determine the frequency, idle state, or guidance information to be provided to the graphics device based on the command patterns and the discussed heuristic algorithm.

As power management and graphics performance are important characteristics of a personal computing device, it may be desirable to better manage power in graphics devices.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
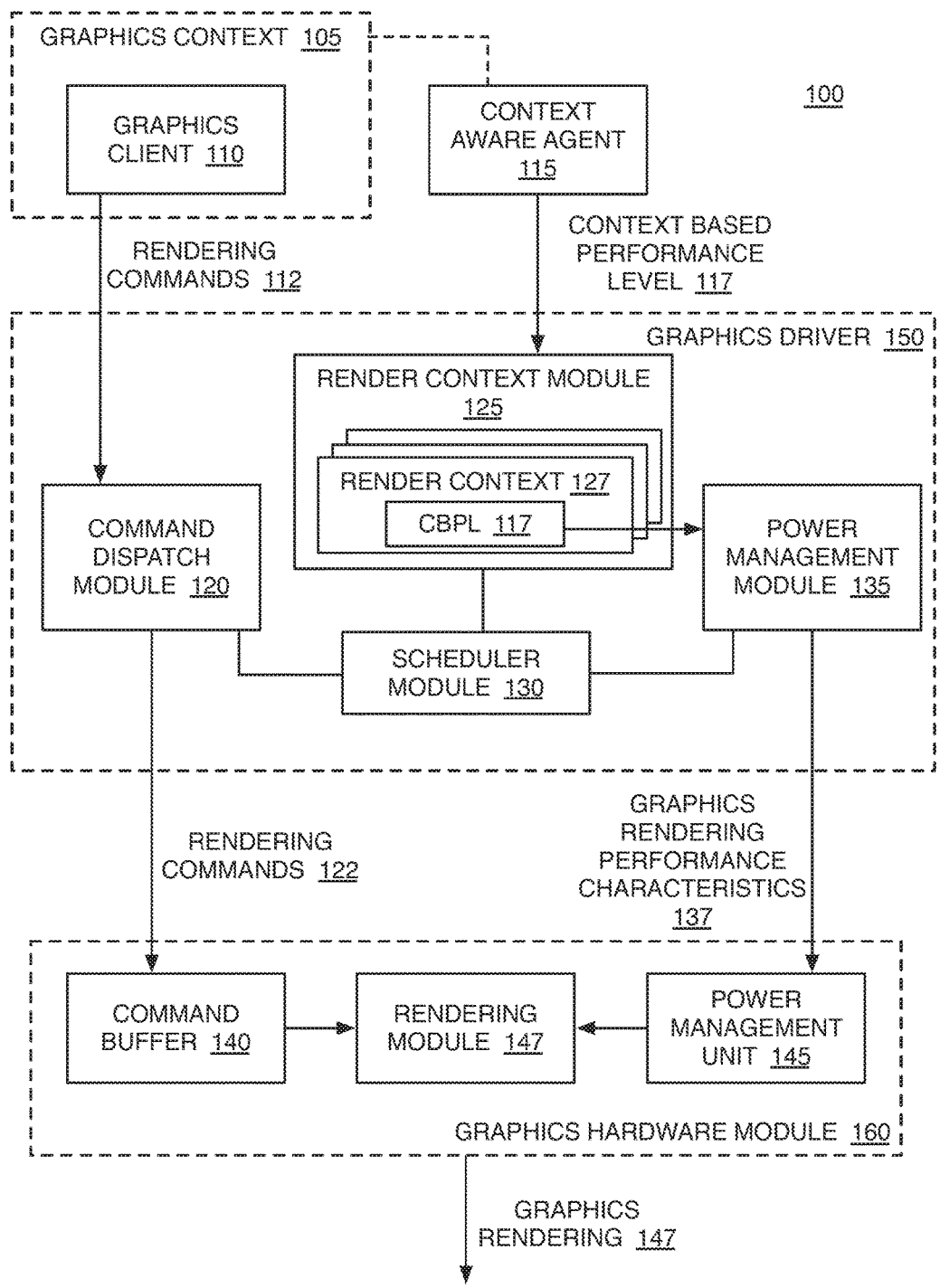
FIG. 1 is an illustrative diagram of an example system for managing power in a device.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, laptops, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below related to context aware power management for graphics devices.

As described above, in graphics device power management, frequency scaling and/or idle states management may be introduced. For example, a graphics driver may dynamically provide an actual operating frequency and/or an idle state to the graphics device or a graphics driver may provide guidance information to the graphics device such that the graphics device may determine the frequency or idle state based on, or based in part on, the provided guidance information. A power manager of the graphics driver may monitor ongoing commands being dispatched from the graphics driver to the graphics device, for example, and determine the frequency, idle state, or guidance information to be provided to the graphics device based on the commands and using a heuristic algorithm.

However, such implementations may not take into account the graphics context (e.g., characteristics of the graphics client and/or other graphics characteristics related to the device or rendering) associated with the commands being dispatched by the graphics driver and, therefore, the selected frequency, idle state, or guidance information may be not be optimized. As will be described in greater detail below, a context aware agent of a device may generate a context based performance level associated with a graphics context of the device. The graphics context may include one or more of a variety of factors such as, for example, the graphics client (e.g., an application or virtual machine running on the device) associated with the rendering commands, how many and/or what types of other applications or virtual machines are running on the device, which application or virtual machine is in the display foreground of the device, or the like. Based on the graphics context, the context aware agent may generate the context based performance level as discussed. The context based performance level may be selected from two or more available performance levels such as, for example, a strict performance level and an elastic performance level, or additional levels may be used. A strict performance level may provide an indication that the graphics hardware module should operate as quickly as possible to complete rendering commands, having limited room for power saving, while an elastic performance level may provide an indication that the graphics hardware module may operate more moderately and may thereby save more power, for example.

The context based performance level may be transferred from the context aware agent to a render context module, which may be implemented via a graphics driver. The context based performance level may be stored as a portion of a render context and the render context may be associated with a graphics client and/or a graphics context, for example. In general, the render context module may store any number of render contexts and each render context may provide a structure in the graphics driver that includes the device states (e.g., register values, device internal variables, internal pipelines, and the like) as specified by graphics client, for example. The power management module may determine the one or more graphics rendering performance/ power characteristics based on the context based performance level (and, in some examples, other portions of the render context). For example, the power management module may also determine the one or more graphics rendering performance characteristics based on traditional evaluations of ongoing rendering commands using heuristic algorithms or the like. The graphics rendering performance characteristics may include an operating frequency for the graphics hardware module or idle state(s), which may be provided dynamically in some examples, or guidance information, or the like. The guidance information may include any information that may allow the graphics hardware module to determine graphics rendering operation parameters. Based on the graphics rendering performance characteristics, the graphics hardware module may perform graphics renderings and provide them to other components of the device such that they may be displayed or presented to a user, for example.

As discussed, as used herein, "graphics context" may include a graphics client, characteristics of the graphics client, or other graphics characteristics related to the device or rendering such as other graphics clients (e.g., applications or virtual machines) running on the device, or which graphics client is on a foreground of the device, or the like. The graphics context may also include a user-selected power consumption setting or a security status of the graphics client, for example. As used herein, "render context" may include a structure in the graphics driver that includes the device states (e.g., register values, device internal variables, internal pipelines, and the like) as specified by graphics client, for example. Upon scheduling a new graphics client (or switching between graphics clients), a device may be restored or updated to the device state as defined by the associated render context. As discussed, a context based performance level associated with a graphics context may be determined and stored as, for example, a component or portion of the render context.

FIG. 1 is an illustrative diagram of an example system 100 for managing power in a device, arranged in accordance with at least some implementations of the present disclosure. As shown, system 100 may include a graphics client 110, a context aware agent 115, a command dispatch module 120, a render context module 125, a scheduler module 130, a power management module 135, a command buffer 140, a rendering module 147, and a power management unit 145. As shown, in some examples, command dispatch module 120, render context module 125, scheduler module 130, and/or power management module 135 may be implemented via a graphics driver 150, which may be implemented via one or more central processing units, which are not shown for the sake of clarity. Also as shown, render context module 125 may store any number of render contexts such as render context 127. Further, in some examples, command buffer 140, rendering module 147, and/or power management unit 145 may be implemented via a graphics hardware module 160. As is discussed further below, graphics client 110 and/or context aware agent 115 may be implemented via the one or more central processing units. In general, system 100 may be computer-implemented as is discussed further herein. In various implementations, system 100 may be configured to manage power in a device such that system 100 may provide context aware power management for graphics hardware module 160.

In some examples, system 100 may include additional items that have not been shown in FIG. 1 for the sake of clarity. For example, system 100 may include a radio frequency-type (RF) transceiver, a display, and/or an antenna. Further, system 100 may include additional items such as a speaker, a microphone, an accelerometer, memory, a router, network interface logic, etc. that have not been shown in FIG. 1 for the sake of clarity.

As discussed, system 100 may provide context aware power management for graphics hardware module 160. As shown, context aware agent 115 may monitor graphics context 105. In various examples, context aware agent 115 may include a component of a graphics stack, a user mode driver, an operating system window manager, or a virtual machine display manager, or the like. Graphics context 105 may include one or more of a variety of factors as is discussed further herein. As shown, in some examples, graphics context 105 may include graphics client 110. For example, graphics client 110 may include an application (e.g., a native graphics application) or a virtual machine or the like running on system 100. In some examples, graphics context 105 may include another or multiple other graphics client(s) running on system 100. As shown, graphics client 110 may generate rendering commands 112 which may be transferred to command dispatch module 120. Command dispatch module 120 may transfer (under control of scheduler module 130, for example) one or more of rendering commands 112 as rendering commands 122 to command buffer 140 of graphics hardware module 160 for execution by rendering module 147, for example. The rendering results may be provided or further processed and provided as graphics rendering 147. In general, graphics rendering 147 may be provided to another component of system 100 such as a display device such that image data provided to the user via the display device may be based on graphic rendering 147 or graphics rendering 147 may be provided to another component of system 100 as a source for subsequent rendering operations, or the like.

In general, graphics hardware module 160 may include any graphics based hardware such as, for example, a graphics processing unit, a graphics device, a field programmable gate array, or a graphics card, or the like. Graphics hardware module 160 may operate under a variety of parameters that may impact performance and power usage. For example, graphics hardware module 160 may operate at an operation frequency, which, in general, may be varied (e.g., frequency and voltage scaling may be implemented). Further, graphic hardware module 160 may operate using idle states.

Returning now to context aware agent 115, as discussed, context aware agent 115 may monitor graphics context 105. Based on graphics context 105, context aware agent 115 may generate context based performance level 117. In general, context based performance level 117 may be chosen from one of several performance levels and may be provided as an indication, a tag, or any other suitable data format. In some examples, graphics client 110 may have an associated context based performance level 117. In some examples, two performance levels may be used: strict performance level and elastic performance level. In such examples, context aware agent 115 may provide an indication of either strict performance level or elastic performance level at regular intervals, at changes of performance level (associated with a change in graphics context 105, for example), or the like.

In general, a strict performance level may provide that an evaluation of graphics context 105 indicating graphics hardware module 160 should operate as quickly as possible to complete rendering commands 122 stored in command buffer 140 although even in using the strict performance level, power may be saved as long as the performance is not impacted (e.g., when no rendering command is submitted). Further, as is discussed herein, in using the strict performance level, heuristics algorithms may be used such that power savings may still be achieved. An elastic performance level may provide an indication that graphics hardware module 160 may operate more moderately and may thereby save more power. For example, in using the elastic performance level, power may be saved aggressively even with an associated performance downgrade since graphics context 105 and graphics client 110 may tolerates such a downgrade.

As discussed, in some examples, two performance levels may be used. In other examples, additional performance levels may be used such as, for example, three, four, or more performance levels. Such additional performance levels may provide the advantages of increased granularity in adjusting the performance of graphics hardware module 160 but may come at the cost of added complexity of implementation.

As shown, context based performance level 117 may be transferred from context aware agent 115 to render context module 125. Render context module 125 may store context based performance level 117 in render context 127. As discussed, render context module 125 may store any number of render contexts, as appropriate. Render context 127 may include context based performance level 117 and render context 127 may be associated with graphics client 110, for example. In general, power management module 135 may use render context 127 and context based performance level 117 to determine graphics rendering performance characteristics 137.

As will be appreciated, in the operation of system 100, context based performance level 117 associated with graphics client 110 (or any of the context based performance levels associated with other graphics clients) may change. For example, assuming no change in render context 127 (i.e., no change in the active render context), a change may occur in graphics context 105. In response to such a change, context aware agent 115 may provide a context based performance level, which may be stored in render context 127 (again, there has been no change in the active render context). Render context module 125 may then notify power management module 135 to evaluate the new context based performance level. The new context based performance level may be transferred from render context module 125 to power management module 135 and power management module 135 may evaluate the new context based performance level by comparing it to the current (or previous) context based performance level. If the new context based performance level is different than the current (or previous) context based performance level, power management module 135 may generate graphics rendering performance characteristics 137 using any of the techniques as discussed herein. If the new context based performance level is not different than the current (or previous) context based performance level, power management module 135 may take no action, for example.

In other examples, a context based performance level associated with an inactive graphics client (or context based performance levels associated with inactive graphics clients) may change. In such examples, the new context based performance level may be transferred from context aware agent 115 and stored, via render context module 125, in the render context associated with the graphics client associated with the new context based performance level. Since the render context is not currently active, no notification may be provided to power management module 135 immediately. Upon a change to the render context (i.e., the inactive render context becomes active), scheduler module 130 may schedule rendering commands associated with the (changed) render context making that render context active. Scheduler module 130 may also notify power management module 135 of the change to the new render context. The context based performance level (as a part of the newly active render context, for example) may be transferred to power management module 130 and power management module 130 may evaluate the context based performance level associated with the (now active) render context. In general, based on the context based performance level associated with the (now active) render context (and any other factors as discussed herein), power management module may generate graphics rendering performance characteristics 137 and transfer them to power management unit 145 of graphics hardware module 160, as discussed herein.

As shown, power management module 135 may determine graphics rendering performance characteristics 137 based on context based performance level 117. In some examples, hardware module 160 may provide or expose a list of frequency states and idle states. In such examples, power management module 135 may determine or select a policy governor, based on the performance level, as is discussed further below and in particular with respect to FIG. 6. The determined policy governor (e.g., a performance governor or a power governor) may then determine or select an exact frequency and/or idle states dynamically and provide such frequency or idle state as graphics rendering performance characteristics 137. Further, power management module 135 may evaluate rendering commands 112 (e.g., via command dispatch module 120, as shown) based on a heuristic algorithm or the like in determining the frequencies or idle states. Such techniques may take into consideration both graphics context 105 of system 100 and rendering commands 112, for example. A policy governor may further be informed of information or policies associated with the governor. For example, a performance governor may receive performance targets and a power governor may receive a power budget. Such techniques are discussed further herein and, in particular, with respect to FIG. 6.

In other examples, hardware module 160 may provide or expose a list of modes (e.g. 'performance' or 'power-saving' or the like). In such examples, power management module 160 may specify a mode (via a hardware governor, for example) based on context based performance level 117 as graphics rendering performance characteristics 137 and power management unit 145 may manage the frequency and/or idle states dynamically based policy governors internal to hardware module 160. In such examples, the "real" governor may be implemented via hardware module 160 and the governor in graphics driver 150 may be considered a dummy governor used to select only the mode of operation.

As discussed, context aware agent 115 may generate context based performance level 117 associated with graphics context 105, power management module 135 may determine graphics rendering performance characteristics 137 based on context based performance level 117, and graphics hardware module 160 may perform a graphics rendering based on graphics rendering performance characteristics 137. In general, graphics context 105 may include any information, system status, operating parameters, or the like that may determine or influence the desired performance of graphics hardware module 160. For example, if graphics context 105 is generally graphics intensive, it may be advantageous for graphics hardware module 160 to perform quickly (e.g., at a high operating frequency and minimal idle states) on rendering tasks and power savings may be less of a priority. Alternatively, if graphics context 105 is less graphics intensive, it may be advantageous for graphics hardware module 160 to perform moderately (e.g., at lower operating frequency and with more idle states).

Figure 2:
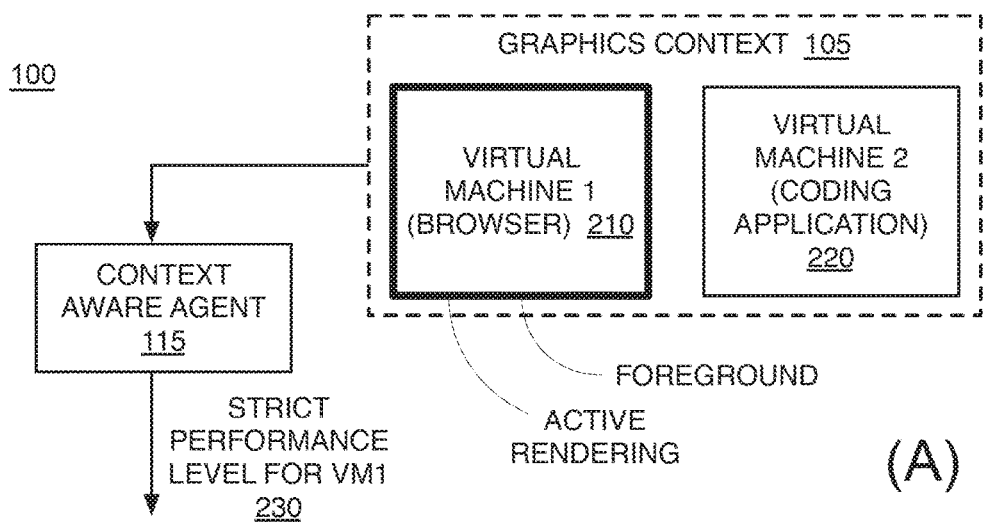
FIG. 2 is an illustrative diagram of example graphics contexts.
Figure 2:
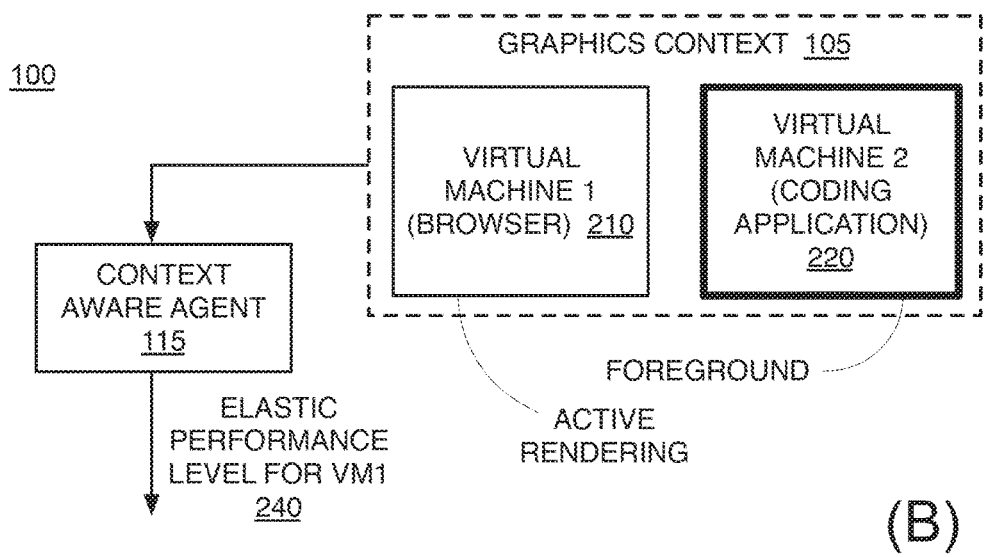

As shown, in some examples, graphics context 105 may include graphics client 110, which, as discussed, may be generating rendering commands 112. Graphics client 110 may include an application or a virtual machine or the like running on system 100. In some examples, graphics context 105 may include additional graphics clients such as additional applications or virtual machines or the like. Further, in examples where graphics context 105 includes one or more applications or virtual machines, the types of applications or virtual machines or their graphics requirements may be a part of graphics context 105. For example, graphics context 105 may include a graphics requirement of an application or virtual machine, or the like. For example, office software may be tagged or associated with a relatively low context based performance level 117. As another example, a virtual machine containing an old operating system may be tagged or associated with a relatively low context based performance level 117 while a virtual machine containing a new operating system may be tagged or associated with a relatively high context based performance level 117, as operating systems become more graphic intensive over time. In other examples, graphics context 105 may include an indication that an application is a graphics application or a virtual machine is a graphics virtual machine. Further, whether an application or virtual machine or the like is being displayed to the user in the foreground or background may be part of graphics context 105. For example, graphics context 105 may include an indication that an application or virtual machine is a graphics application running on a foreground (or background) of a display device of system 100. Turning now to FIG. 2, example graphics contexts are presented.

FIG. 2 is an illustrative diagram of example graphics contexts, arranged in accordance with at least some implementations of the present disclosure. As shown, graphics context 105 may include a virtual machine 1 (browser) 210 and a virtual machine 2 (coding application) 220. Virtual machine 1 (browser) 210 may be performing hypertext markup language 5 (HTML5) based browsing and may generally demand graphics renderings. Virtual machine 2 (coding application) 220 may be allowing a user to draft computer code and may generally not demand graphics renderings. Further, as shown in (A), in some instances, virtual machine 1 (browser) 210 may be in the foreground while, as shown in (B), in some instances, virtual machine 2 (coding application) 220 may be in the foreground (e.g., as a user switches between applications or windows or the like). In the illustrated example, in both (A) and (B), virtual machine 1 (browser) 210 may be actively rendering, as shown.

In the example of FIG. 2, graphics context 105 may include virtual machine 1 (browser) 210, virtual machine 2 (coding application) 220, and an indication of which virtual machine is in the foreground of a display device of system 100. As shown, if virtual machine 1 (browser) 210 is in the foreground, context aware agent 115 may provide a strict performance level for virtual machine 1 (VM1) 230 context based performance level and, if virtual machine 2 (coding application) 220 is in the foreground (i.e., virtual machine 1 (browser) 210 is in the background), context aware agent 115 may provide an elastic performance level for virtual machine 1 (VM1) 240. Using the described techniques, foreground display (e.g., where the user is typically focused and sensitive to quality) may provide a factor in graphics context 105 and may be associated with whether the foreground virtual machine (or application) is graphics intensive, for example. Similarly, if a user enters a full-screen viewing mode, the full-screen viewing mode (associated with the virtual machine or application running in the full-screen) may provide a factor in graphics context 105. In such an example, the factor may be determinative.

Further, context aware agent 115 may manage any or all existing graphics clients (e.g., virtual machine 1 (browser) 210 and virtual machine 2 (coding application) 220) and may associate a context based performance level with the existing graphics clients based on their graphics contexts (e.g., such as foreground/background, priority, etc.). For example, when scheduler module 130 of graphics driver 150 schedules rendering commands 122 associated with a graphics context, scheduler module 130 may provide the associated render context to power management module 135 to follow the context based performance level in the appropriate render context.

Returning now to FIG. 1, discussion of graphics context 105 is continued. As discussed, graphics context 105 may include graphics client 110, which may be a graphics application or a virtual machine, for example. Graphics context 105 may also include additional graphics client(s) running on the device, such as one or more applications, one or more virtual machines, or the like. In other examples, graphics context 105 may include a trust level or security status of an application or virtual machine (e.g., graphics client 110). For example, as virtualization has increased, particularly in smartphones and tablets or the like, some implementations isolate or partition sensitive information (e.g., personal information, work information, or the like) from the unsecure partitions. In some examples, poorly designed applications may user power aggressively in system 100 by utilizing graphics hardware module 160 heavily (and oftentimes, unnecessarily). In such a case, graphics context 105 may include the running of such applications and, for example, context aware agent 115 may provide an elastic performance level such that graphics hardware module 160 may be protected from such misuse. Therefore, for example, graphics context 105 may include a security status of a virtual machine or an application. Further, in such examples, a user may be provided an option or setting such as a user-selected power consumption setting such that graphics context 105 may include the user's preference during the operation of such untrusted or insecure virtual machines or applications.

In some implementations, system 100 may include an option or setting such as a user-selected power consumption setting that may be used in any context deemed necessary by a user. For example, a user may use such a setting when observing a battery is being consumed too quickly, when the user is aware they may not be able to recharge for a long period of time, or the like. In other examples, a user may use such a setting when a graphics rendering is not meeting the user's needs.

In general, the processes and components discussed with respect to FIG. 1 may be implemented in a variety of ways. In some implementations, command dispatch module 120, render context module 125, power management module 135, and/or scheduler module 130 may be implemented via a graphics driver or a kernel mode driver (KMD), or the like. Further the graphics driver or KMD may be implemented via one or more processors as discussed herein and, in particular, with respect to FIG. 7. As discussed, graphics hardware module 160 may include a graphics processing unit, a graphics device, a graphics card, or a field programmable gate array, or the like. System 100 may be implemented via any suitable device as discussed herein, and in particular with respect to FIG. 8 and FIG. 9 such as, for example, a laptop, a smartphone, a tablet device, or an ultrabook, or the like.

As will be discussed in greater detail below, system 100 may be used to perform some or all of the various functions and operations discussed below in connection with FIGS. 3-5 and the operations discussed elsewhere herein.

Figure 3:
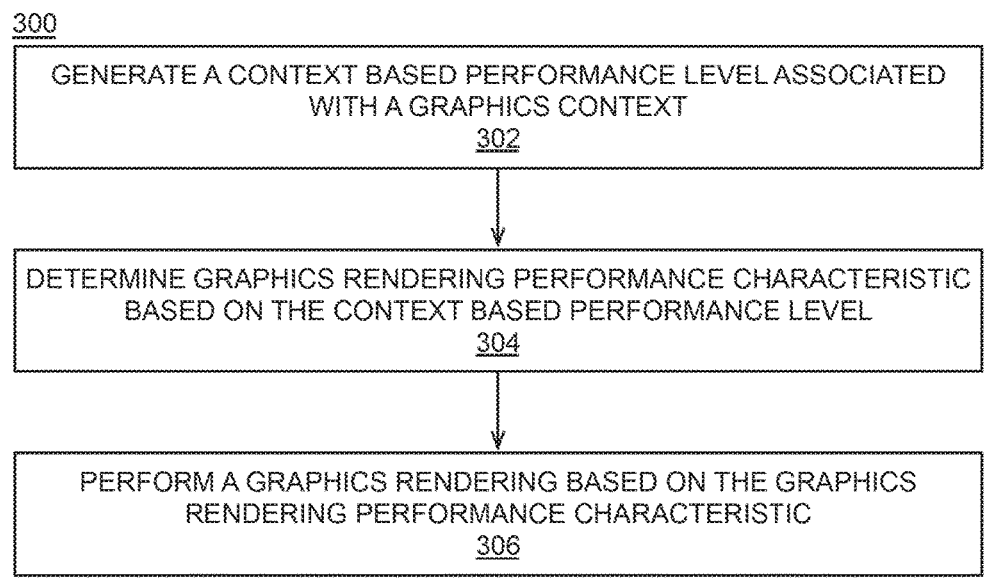
FIG. 3 is a flow chart illustrating an example process for managing power in a device.

FIG. 3 is a flow chart illustrating an example process 300, arranged in accordance with at least some implementations of the present disclosure. In the illustrated implementation, process 300 may include one or more operations, functions or actions as illustrated by one or more of blocks 302, 304, and/or 306. By way of non-limiting example, process 300 will be described herein with reference to example system 100.

Process 300 may be utilized as a computer-implemented method for managing power in a device. Process 300 may begin at block 302, "GENERATE A CONTEXT BASED PERFORMANCE LEVEL ASSOCIATED WITH A GRAPHICS CONTEXT", where a context based performance level associated with a graphics context may be generated. For example, context based performance level 117 may be generated by context aware agent 115. The context based performance level may be selected from two or more performance levels, for example, and may be based on any of a variety of factors associated with a graphics context such as a graphics requirement of graphics client running in a foreground of the device, a user-selected setting, or a security level of an application or virtual machine, or the like.

Processing may continue from operation 302 to operation 304, "DETERMINE GRAPHICS RENDERING PERFORMANCE CHARACTERISTIC BASED ON THE CONTEXT BASED PERFORMANCE LEVEL", where graphics device performance characteristic or characteristics may be determined based at least in part on the context based performance level. For example, power management module 135 may generate graphics rendering performance characteristics 137 based on context based performance level 117. In some examples, graphics rendering performance characteristics 137 may include exact frequency and/or idle states. In such examples, the frequencies or idle states may be generated dynamically and may be based on a provided or exposed list of frequency states and idle states. In other examples, graphics rendering performance characteristics 137 may include guidance information such as a mode. In such examples, the mode may be based on a provided or exposed a list of modes (e.g. 'performance' or 'power-saving' or the like) and power management module 160 may provide a mode such that hardware module 160 may actively select the frequency state or idle state.

Processing may continue from operation 304 to operation 306, "PERFORM A GRAPHICS RENDERING BASED ON THE GRAPHICS RENDERING PERFORMANCE CHARACTERISTIC", where a graphics rendering may be performed based at least in part on the graphics rendering performance characteristic(s). For example, graphics hardware module 160 may perform the graphics rendering based on graphics rendering performance characteristics 137. As discussed, in some examples, graphics rendering performance characteristics 137 may include an operating frequency or an idle state for graphics hardware module 160. In other examples, graphics rendering performance characteristics 137 may include guidance information (e.g., a mode), on which graphics rendering performance characteristics 137 may determine its operating parameters.

In general, process 300 may be repeated as needed. For example, process 300 may be repeated when a different context based performance level is received by power management module 135, for example.

Some additional and/or alternative details related to process 300 may be illustrated in one or more examples of implementations discussed in greater detail below with regard to FIG. 4.

Figure 4:
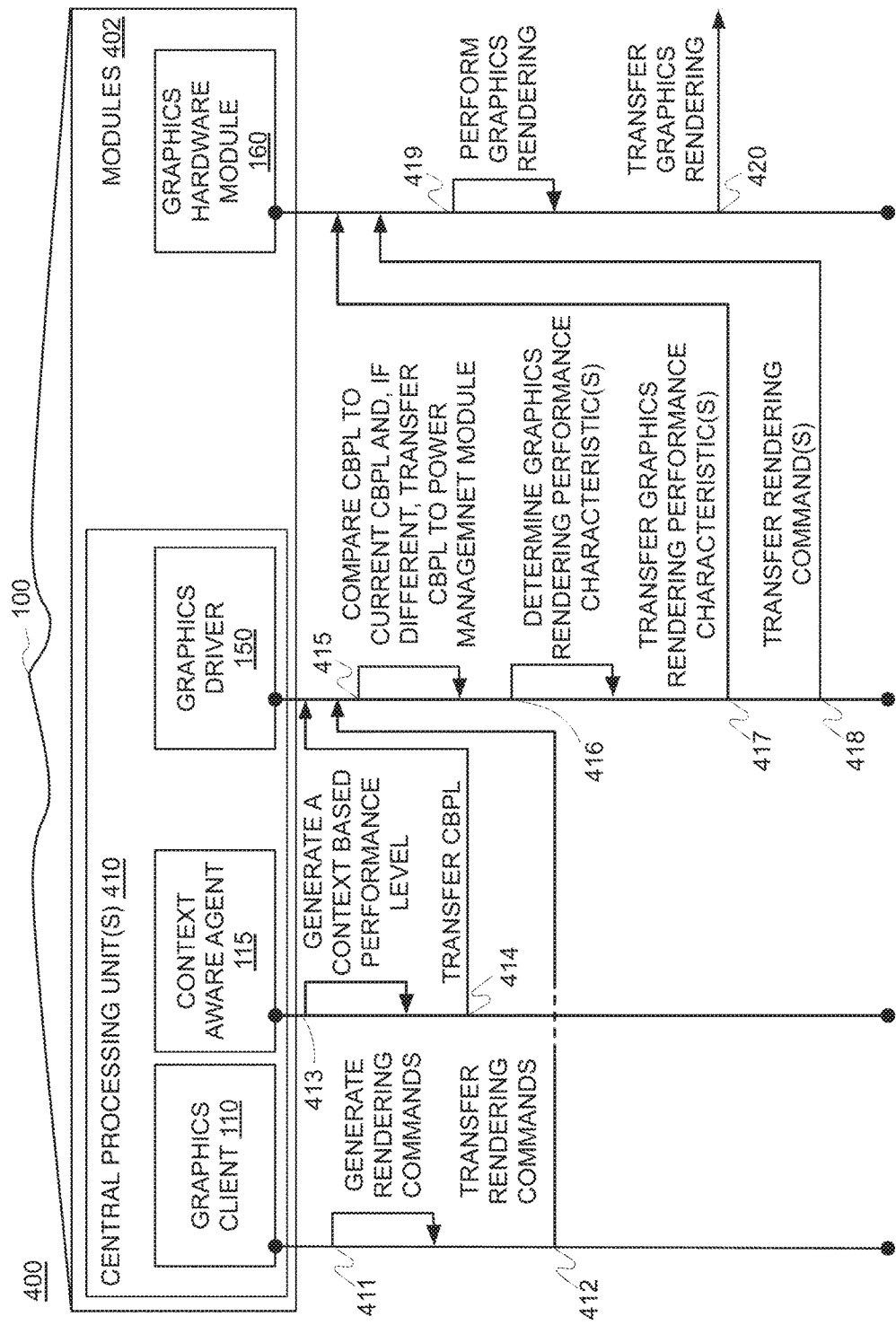
FIG. 4 is an illustrative diagram of an example process for managing power in a device in operation.

FIG. 4 is an illustrative diagram of example system 100 and process 400 for managing power in a device in operation, arranged in accordance with at least some implementations of the present disclosure. In the illustrated implementation, process 400 may include one or more operations, functions or actions as illustrated by one or more of actions 411, 412, 413, 414, 415, 416, 417, 418, 419, and/or 420. By way of non-limiting example, process 400 will be described herein with reference to example system 100.

In the illustrated implementation, system 100 may include modules 402, the like, and/or combinations thereof. For example, modules 402, may include graphics hardware module 160, graphics client 110, context aware agent 115, and/or graphics driver 150. Graphics client 110, context aware agent 115, and/or graphics driver 150 may be implemented via one or more central processing units 310, for example. As discussed, graphics hardware module 160 may include a graphics processing unit, a graphics device, a field programmable gate array, or a graphics card, or the like. Context aware agent 115 may be configured to generate a context based performance level associated with a graphics context and transfer the context based performance level to graphic driver 150. Graphics client 110 may be configured to generate one or more rendering commands and transfer the rendering commands to graphics driver 150. Graphics driver 150 may be configured to receive rendering commands and a context based performance level, determine one or more graphics rendering performance characteristics based at least in part on the context based performance level and/or the rendering commands, and transfer the graphics rendering performance characteristic(s) and rendering command(s) to graphics hardware module 160. Graphics hardware module 160 may be configured to perform a graphics rendering based at least in part on the one or more graphics rendering performance characteristics and/or the rendering commands, and transfer the graphics rendering to another component of system 100, such as for example, a display device configured to present image data such that the presentment of image data via the display device is based at least in part on the graphics rendering.

Although system 100, as shown in FIG. 4, may include one particular set of blocks or actions associated with particular modules, these blocks or actions may be associated with different modules than the particular module illustrated here.

Process 400 may be utilized as a computer-implemented method for managing power in a device. Process 400 may begin at operation 413 or operation 411 or those operations simultaneously. For the sake of description, it may be assumed process 400 may begin at operation 411, "GENERATE RENDERING COMMANDS", where one or more rendering commands may be generated. Rendering commands 112 may be generated by graphics client 110, for example. In general, any number of graphics clients may be running on system 100 and one or more of the graphics clients may generate rendering commands as needed.

Processing may continue from operation 411 to operation 412, "TRANSFER RENDERING COMMANDS", where all or a portion of the one or more rendering commands may be transferred. Rendering commands 112 may be transferred from graphics client 110 to graphics driver 150, for example. In some examples, rendering commands 112 may be transferred to command dispatch module 120 of graphics driver 150.

Processing may continue (or, alternatively, could begin at) at operation 413, "GENERATE A CONTEXT BASED PERFORMANCE LEVEL", where a context based performance level associated with a graphics context may be generated. The context based performance level associated with a graphics context may be generated when the graphics client is launched or during run-time when characteristics associated with the graphics client or graphics context change, for example. For example, context based performance level 117 may be generated by context aware agent 115. The context based performance level may be selected from two or more performance levels such as, for example, a strict performance level and an elastic performance level. The context based performance level may be based on any of a variety of factors associated with a graphics context such as any of those discussed herein.

Processing may continue from operation 413 to operation 414, "TRANSFER CONTEXT BASED PERFORMANCE LEVEL (CBPL)", where the context based performance level may be transferred. Context based performance level 117 may be transferred from context aware agent 115 to render context module 125 and stored as a portion of render context 127, for example.

Processing may continue from operation 414 to operation 415, "COMPARE CONTEXT BASED PERFORMANCE LEVEL (CBPL) TO CURRENT CONTEXT BASED PERFORMANCE LEVEL (CBPL) AND, IF DIFFERENT, TRANSFER CONTEXT BASED PERFORMANCE LEVEL (CBPL) TO POWER MANAGEMENT MODULE", where the context based performance level may be compared to a current (or previous) context based performance level and, if they are different, the context based performance level may be transferred to the power management module (internal to graphics driver 150). If they are the same, no action may be taken. For example, the comparison of the context based performance level and the current (or previous) context based performance level may be performed by power management module 135 as discussed herein. In some examples, context based performance level 117 may be transferred as a portion or component of render context 127. As discussed above, such implementations may apply when the render context associated with a performance level is the current render context, for example.

Processing may continue from operation 415 to operation 416, "DETERMINE GRAPHICS RENDERING PERFORMANCE CHARACTERISTIC", where graphics device performance characteristic or characteristics may be determined based at least in part on the context based performance level. For example, power management module 135 may generate graphics rendering performance characteristics 137 based on context based performance level 117. In some examples, graphics rendering performance characteristics 137 may include exact frequency and/or idle states. In such examples, the frequencies or idle states may be generated dynamically and may be based on a provided or exposed list of frequency states and idle states. In other examples, graphics rendering performance characteristics 137 may include guidance information such as a mode. In such examples, the mode may be based on a provided or exposed a list of modes (e.g. 'performance' or 'power-saving' or the like) and power management module 160 may provide a mode such that hardware module 160 may actively select the frequency state or idle state.

Processing may continue from operation 416 to operation 417, "TRANSFER GRAPHICS RENDERING PERFORMANCE CHARACTERISTIC(S)", where the graphics rendering performance characteristics may be transferred. For example, graphics rendering performance characteristics 137 may be transferred from graphics driver 150 to graphics hardware module 160. In some examples, graphics rendering performance characteristics 137 may be transferred from power management module 135 of graphics driver 150 to power management unit 145 of graphics hardware module 160. As discussed, in some examples, graphics rendering performance characteristics 137 may include exact frequency and/or idle states be transferred dynamically and, in other examples, graphics rendering performance characteristics 137 may include guidance information.

Processing may continue from operation 417 to operation 418 or operation 418 may be performed at substantially any time during process 400 as needed. In any event, processing may continue at operation 418, "TRANSFER RENDERING COMMAND(S)", where rendering commands may be transferred. For example, one or more rendering commands 122 may be transferred from graphics driver 150 to graphics hardware module 160. In some examples, one or more rendering commands 122 may be transferred from command dispatch module 120 of graphics driver 150 to command buffer 140 of graphics hardware module 160. As will be appreciated, not every rendering command generation requires a performance level change and the two paths (i.e., the path for rendering commands 112 and 122 and the path for context based performance level 117 and graphics rendering performance characteristics 137) may occur in parallel.

Processing may continue from operation 418 to operation 419, "PERFORM GRAPHICS RENDERING", where a graphics rendering may be performed based at least in part on the graphics rendering performance characteristic(s). For example, graphics hardware module 160 may perform the graphics rendering based on graphics rendering performance characteristics 137. As discussed, in some examples, graphics rendering performance characteristics 137 may include an operating frequency or an idle state for graphics hardware module 160. In other examples, graphics rendering performance characteristics 137 may include guidance information (e.g., a mode), on which graphics rendering performance characteristics 137 may determine its operating parameters.

Processing may continue from operation 419 to operation 420, "TRANSFER GRAPHICS RENDERING", where one or more graphics renderings may be transferred. For example, graphics rendering 147 may be transferred to another component or module of system 100. In some examples, graphics rendering 147 may be transferred to a display device configured to present image data such that the presentment of image data via the display device is based at least in part on the graphics rendering. In other examples, graphics rendering 147 may be transferred to another component of system 100 for use as a source for subsequent rendering operations, or the like.

In general, process 400 may be repeated as needed or performed substantially continuously. For example, operations 413, 414, 415, 416, and/or 417 associated with determining and providing context aware graphics rendering characteristics may be repeated when a different context based performance level is generated or received, as context based performance levels may be generated on a periodic basis, or as graphics contexts change, or the like. Operations 411, 412, 418, 419, and/or 420 associated with generating and executing rendering commands may be performed as needed by system 100, for example, and, as discussed, may be scheduled and/or coordinated using the techniques discussed herein to provide greater performance or power savings for the device.

As discussed with respect to FIG. 1 above, context based performance level 117 may be transferred from context aware agent 115 to render context module 125 and context based performance level 117 may be evaluated by render context module 125 or scheduler module 130 (or those modules together) to determine whether the context based performance level has changed. An example of such a technique is illustrated in FIG. 5.

Figure 5:
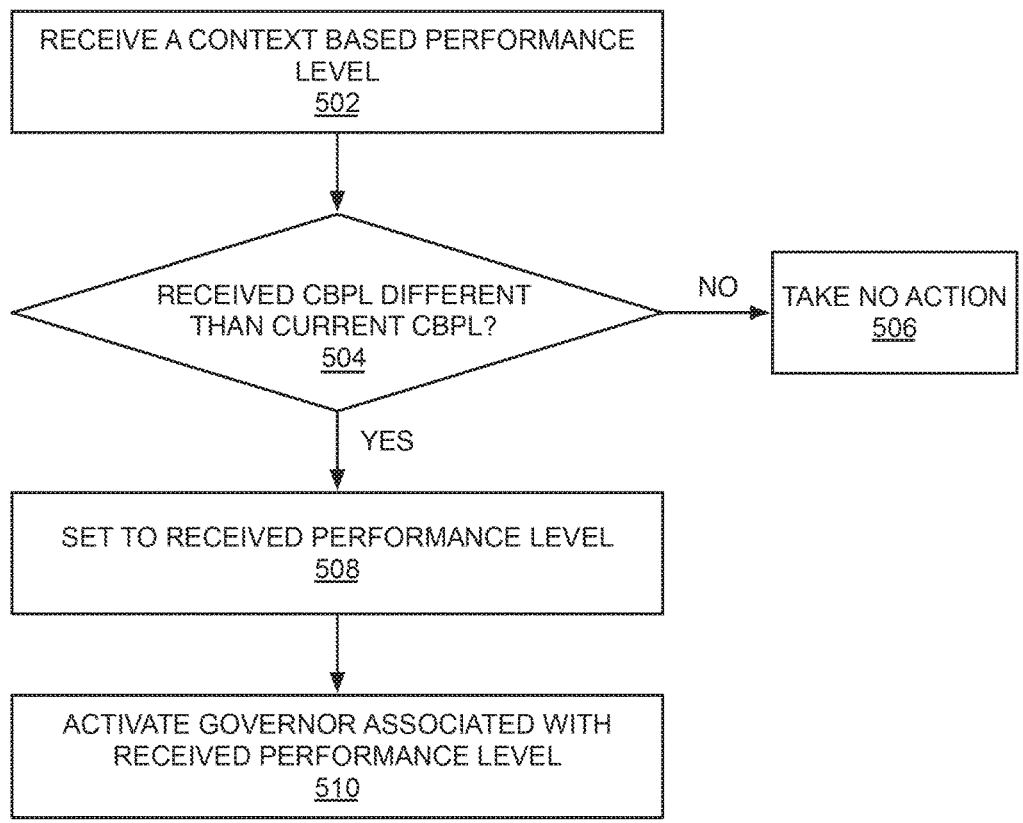
FIG. 5 is an illustrative diagram of an example method for evaluating a context based performance level.

FIG. 5 is a flow chart illustrating an example process 500 for evaluating a context based performance level, arranged in accordance with at least some implementations of the present disclosure. In the illustrated implementation, process 500 may include one or more operations, functions or actions as illustrated by one or more of blocks 502, 504, 508, 510, and/or 512. By way of non-limiting example, process 500 will be described herein with reference to example system 100 of FIGS. 1 and/or 7.

Process 500 may be utilized as a computer-implemented method for managing power in a device. As discussed, process 500 may apply when the render context associated with a context based performance level is the active render context. Process 500 may begin at operation 502, "RECEIVE A CONTEXT BASED PERFORMANCE LEVEL", where a context based performance level may be received. Context based performance level 117 may be received at render context module 125 and stored as a portion of render context 127, which may be associated with graphics client 110, for example. In some examples, a change may occur in graphics context 105. In response to such a change, context aware agent 115 may provide a context based performance level, which may be stored in render context 127 (the active render context).

Processing may continue from operation 502 to operation 504, "DIFFERENT THAN CURRENT CONTEXT BASED PERFORMANCE LEVEL?", where it may be determined whether context based performance level 117 (i.e., the received or new context based performance level) is different than a current context based performance level in the associated render context. Operation 504 may be performed by power management module 135, for example. Render context module 125 may notify power management module 135 to evaluate the new context based performance level (in the still active render context). The new context based performance level may be transferred from render context module 125 to power management module 135 and power management module 135 may evaluate the new context based performance level by comparing it to the current (or previous) context based performance level. If the (new) context based performance level is different than the current context based performance level, process 500 may continue at operation 508. If context based performance level 117 is not different than the current context based performance level, process 500 may continue at operation 506, "TAKE NO ACTION", where no action may be taken.

Processing may continue from operation 504 to operation 508, "SET TO RECEIVED PERFORMANCE LEVEL", where the performance level may be set to context based performance level 117. For example, the performance level setting may be changed at power management module 135.

Processing may continue from operation 508 to operation 510, "ACTIVATE GOVERNOR ASSOCIATED WITH RECEIVED PERFORMANCE LEVEL", where a governor associated with context based performance level 117 may be activated to generate graphics rendering performance characteristics 137, for example.

In general, process 500 may be repeated any number of times as context based performance levels may be received at block 502 as changes occur while a current render context is still active.

As discussed above, in other examples, a context based performance level associated with an inactive graphics client (or context based performance levels associated with inactive graphics clients) may change. In such examples, the evaluation of the context based performance level may be postponed until the associated render context becomes active. For example, the context based performance level may be stored in an inactive render context associated with the inactive graphics client. When the inactive render context becomes active (via scheduler module 130, for example), scheduler module 130 may notify power management module 135 of the change to the newly active render context and power management module 130 may evaluate the context based performance level associated with the (now active) render context. In general, based on the context based performance level associated with the (now active) render context (and any other factors as discussed herein), power management module may generate graphics rendering performance characteristics 137 and transfer them to power management unit 145 of graphics hardware module 160, as discussed herein.

As discussed with respect to FIG. 1 above, power management module 135 may generate graphics rendering performance characteristics 137 by activating a governor associated with context based performance level 117. An example of such a power management module is illustrated in FIG. 6.

Figure 6:
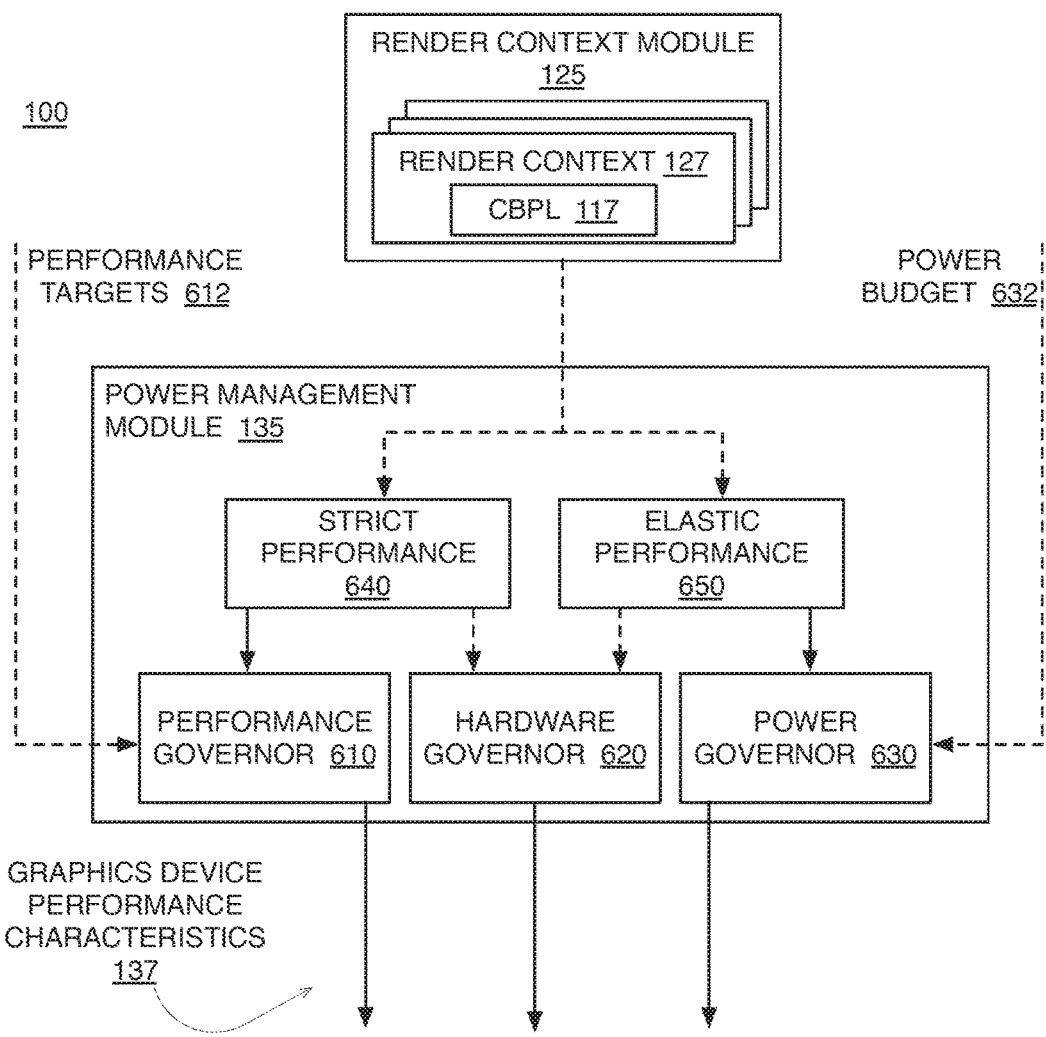
FIG. 6 is an illustrative diagram of an example power management module.

FIG. 6 is an illustrative diagram of an example power management module, arranged in accordance with at least some implementations of the present disclosure. As shown, power management module 135 may include a performance governor 610, a hardware governor 620, and a hardware governor 630. As power management module 135 may receive context based performance level 117 from render context module 125. In some examples, context based performance level 117 may be a portion or component of render context 125. As shown, in an illustrative example, context based performance level 117 may be either strict performance 640 or elastic performance 650.

In some implementations, graphics hardware module 160 (see FIG. 1) may support modes of operation such as, for example, a "performance mode" and a "power saving mode". In such implementations, context based performance level 117 (whether set as strict performance or elastic performance) may be mapped substantially directly to the associated mode of graphics hardware module 160. For example, if context based performance level 117 is strict level, performance governor 610 may provide an indication of "performance mode" via graphics rendering performance characteristics 137 and, if context based performance level 117 is elastic level, performance governor 610 may provide an indication of "power saving mode" via graphics rendering performance characteristics 137. Such an implementation may also include activating hardware governor 620. As discussed, power management module 135 may provide guidance information such that graphics hardware module 160 may use the guidance information to determine operations parameters such as, for example, an operating frequency (e.g., a frequency or voltage or the like) or an idle state, or the like. Such an implementation may thereby provide graphics hardware module 160 a coarse-grain indication (i.e., "performance mode" or "power saving mode") and a fine-grain indication (guidance information) to graphics hardware module 160.

In other implementations, graphics hardware module 160 may support graphics driver 150 setting graphics rendering performance characteristics 137 such as operating frequency and idle states directly. In such implementations, context based performance level 117, whether set as strict performance or elastic performance, may activate performance governor 610 or power governor 630, respectively, to generate graphics rendering performance characteristics 137 including, an operating frequency (e.g., a frequency or a voltage or the like) or an idle state, or the like, as discussed herein.

Further, as shown in FIG. 6, power management module 135 may receive performance targets 612 and/or power budget 632. As shown, performance targets 612 may be used to influence the behavior of performance governor 610 and power budget 632 may be used to influence the behavior of power governor. In some examples, performance targets 612 and/or power budget 632 may be received from an Operating System directed configuration and Power Management (OSPM) module or an Advanced Configuration and Power Interface (ACPI) module or the like. In general, the illustrated governors may be implemented as policy groups such that each policy group (as associated with a context based performance level 117, for example) may include and activate one or more governors as needed to implement the desired policy.

While implementation of example processes 300, 400, and 500 and processes discussed herein may include the undertaking of all operations shown in the order illustrated, the present disclosure is not limited in this regard and, in various examples, implementation of processes 300, 400, and 500 may include the undertaking only a subset of the blocks shown and/or in a different order than illustrated.

In addition, any one or more of the blocks of FIGS. 1-6 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) ma) undertake one or more of the blocks shown in FIGS. 1-6 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 7:
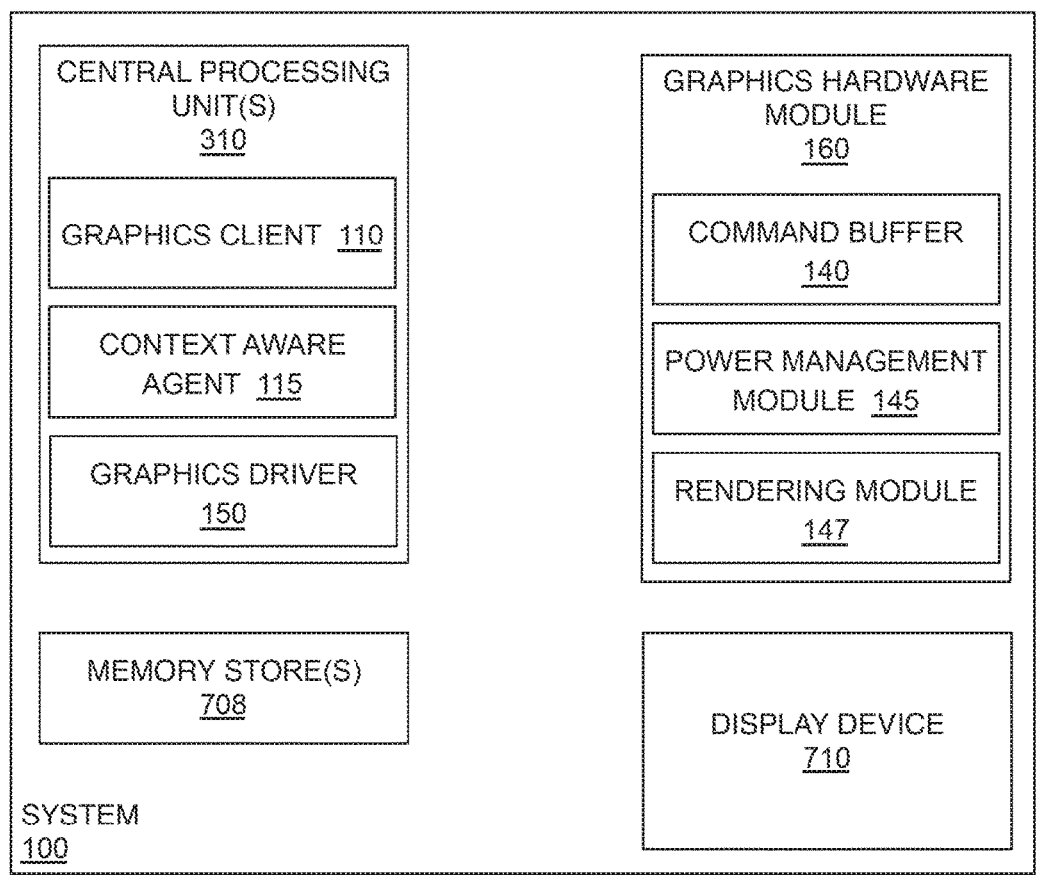
FIG. 7 is an illustrative diagram of an example system for managing power in a device.

FIG. 7 is an illustrative diagram of an example system 100 for managing power in a device, arranged in accordance with at least some implementations of the present disclosure. In the illustrated implementation, system 100 may include one or more central processing units 310, one or more memory stores 708, graphics hardware module 160, and/or a display device 710. Central processing units 310, memory store 708 and graphics hardware module 160 may be capable of communication with one another, via, for example, a bus or other access. In various implementations, display device 710 may be integrated in system 100 or implemented separately from system 100.

As shown in FIG. 7, and discussed above, graphics client 110, context aware agent 115, and/or graphics driver 150 may be implemented via central processing units 310. Further, command buffer 140, power management module 145, and/or rendering module 147 may be implemented via graphics hardware module 160.

As will be appreciated, the modules illustrated in FIG. 7 may include a variety of software and/or hardware modules and/or modules that may be implemented via software and/or hardware. For example, graphics client 110, context aware agent 115, and/or graphics driver 150 may be implemented as software via central processing units 310 and command buffer 140, power management module 145, and/or rendering module 147 may be implemented as hardware via graphics hardware module 160. Further, the shown memory stores 1008 may be shared memory for central processing units 1006 and/or graphics hardware module 160, for example. Also, system 100 may be implemented in a variety of ways. For example, system 100 (excluding display device 710) may be implemented as a single chip or device having a graphics processor, a quad-core central processing unit, on-board cache, and a memory controller input/output (I/O) module (not shown). In other examples, system 100 (again excluding display device 710) may be implemented as a chipset.

Central processing units 310 may include any suitable implementation including, for example, microprocessor(s), multicore processors, application specific integrated circuits, chip(s), chipsets, or the like. Further, graphics hardware module 160 may include any suitable implementation including, for example, processor(s), multicore processors, application specific integrated circuits, programmable logic devices, graphics cards, integrated graphics, general purpose graphics processing unit(s), or the like. In addition, memory stores 708 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 708 may be implemented by cache memory. In various examples, system 100 may be implemented as a chipset or as a system on a chip.

Figure 8:
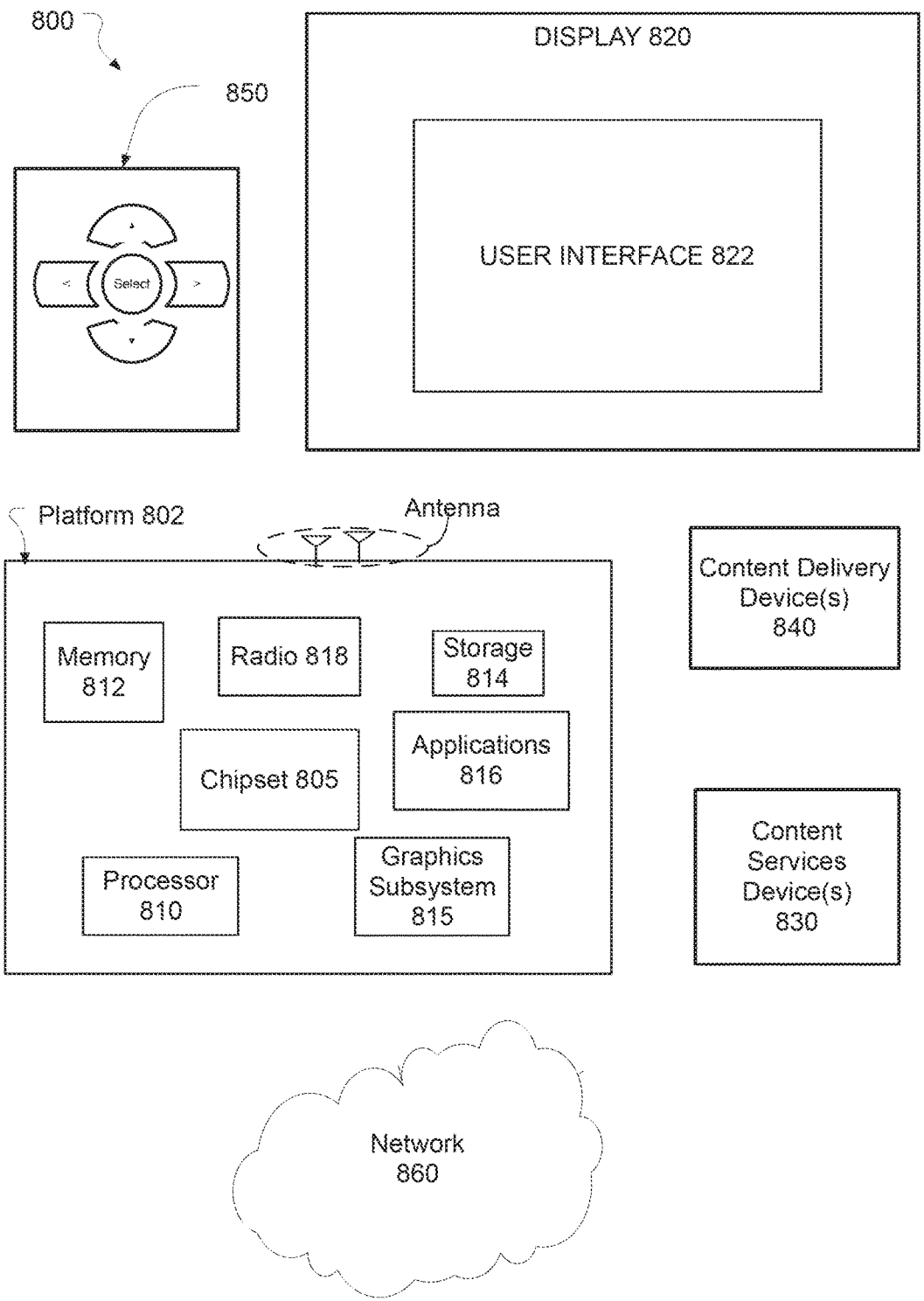
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information ma be used to route media information through a system, or instruct a node to process the media information in a predetermined manner. The embodiments, however, are not limited to the elements or in the context shown or described in FIG. 8.

Figure 9:
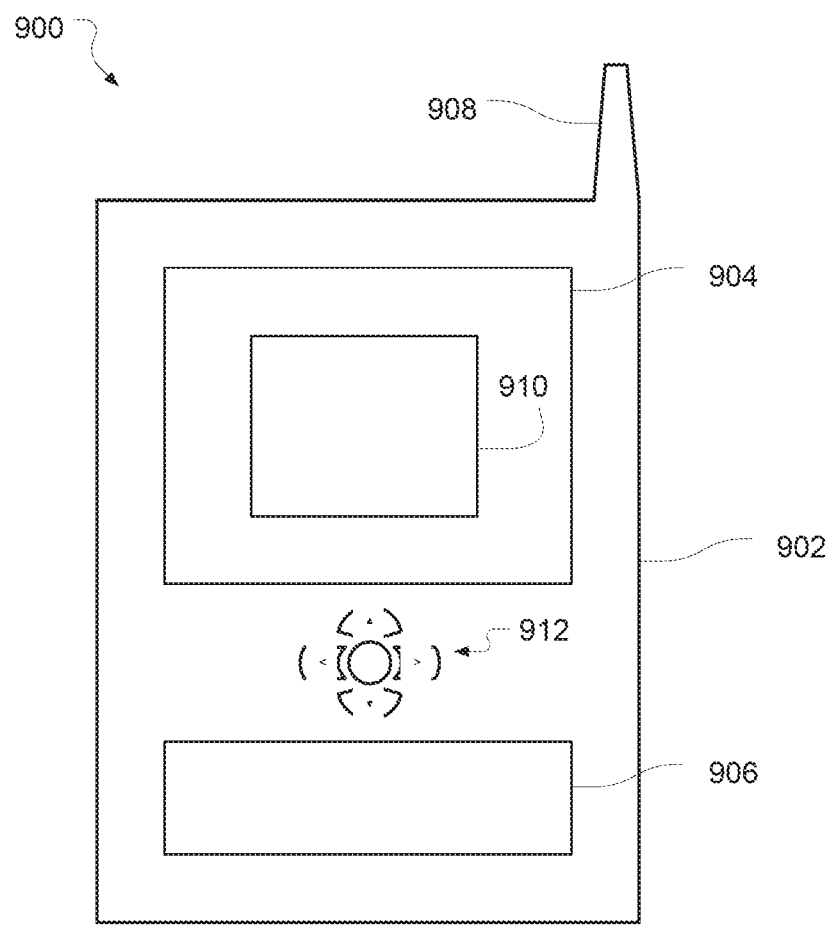
FIG. 9 is an illustrative diagram of an example system, all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for managing power in a device may include generating, at a context aware agent of the device, a context based performance level associated with a graphics context. One or more graphics rendering performance characteristics based at least in part on the context based performance level may be determined at a power management module of the device. A graphics rendering may be performed based at least in part on the one or more graphics rendering performance characteristics at a graphics hardware module of the device.

In a further example of a computer-implemented method for managing power in a device, the context based performance level may be transferred from the context aware agent to a render context module of the device. The context based performance level may be stored in a render context via the render context module such that the render context may be associated with the graphics context and a graphics client. Whether the context based performance level is different than a current context based performance level may be determined and, if the context based performance level is different than the current context based performance level, the context based performance level may be transferred from the render context module to the power management module and, if the context based performance level is not different than the current context based performance level, no action may be taken. Determining whether the context based performance level is different than the current context based performance level may be performed via the render context module or a scheduler module of the device. One or more rendering commands may be generated at the graphics client. The one or more rendering commands may be transferred from the graphics client to a command dispatch module of the device. A change from a current graphics client to the graphics client associated with one or more rendering commands may be determined. The context based performance level may be transferred from the render context module to the power management module in response to the change such that transferring the context based performance level may include transferring the context based performance level as part of the render context. At least one of the one or more rendering commands may be transferred from the command dispatch module to a command buffer of the graphics hardware module. Performing the graphics rendering may include performing the graphics rendering based at least in part on the at least one of the one or more rendering commands. The one or more graphics rendering performance characteristics may be transferred from the power management module to a power management unit of the graphics hardware module. Determining the one or more graphics rendering performance characteristics may further include evaluating the one or more rendering commands based on a heuristic algorithm. Evaluating the one or more rendering commands may be performed via the power management module. Determining the one or more graphics rendering performance characteristics may further include activating one or more governors associated with the context based performance level. The one or more governors may include a performance governor, a hardware governor, or a power governor. The performance governor may receive performance targets. The power governor may receive a power budget. The context based performance level may include a strict performance level or an elastic performance level. The graphics context may include the graphics client, such that the graphics client may include a graphics application or a virtual machine, one or more applications running on the device, one or more virtual machines running on the device, a graphics requirement of the graphics client, an indication of whether the graphics client is running on a foreground or a background of the device, a user-selected power consumption setting, or a security status of the graphics client. The graphics context may include a first virtual machine running a hypertext markup language 5 (HTML5) browser, a second virtual machine comprises a coding application such that, if the first virtual machine is in the foreground, the context based performance level may be the strict performance level and, if the first virtual machine is in the background, the context based performance level may be the elastic performance level. The one or more graphics rendering performance characteristics may include an operating frequency, an idle state, or guidance information. The context aware agent may include a component of a graphics stack, a user mode driver, an operating system window manager, or a virtual machine display manager. The command dispatch module, the render context module, the power management module, and the scheduler module may be implemented via a graphics driver. The graphics hardware module may a graphics processing unit or a field programmable gate array.

In another example, a system for managing power in a device may include a display device, one or more processors, one or more memory stores, a context aware agent, a power management module, and a graphics hardware module. The one or more processors may be communicatively coupled to the display device. The one or more memory stores may be communicatively coupled to the one or more processors. The context aware agent may be configured to generate a context based performance level associated with a graphics context of the device. The power management module may be configured to determine one or more graphics rendering performance characteristics based at least in part on the context based performance level. The graphics hardware module may be configured to perform a graphics rendering based at least in part on the one or more graphics rendering performance characteristics. The presentment of image data via the display device may be based at least in part on the graphics rendering.

In a further example of a system for managing power in a device, the system may include a graphics client, a command dispatch module, a command buffer, a power management unit, a render context module, a scheduler module, and a rendering module. The graphics client may be configured to generate one or more rendering commands. The command dispatch module may be configured to receive the one or more rendering commands and transfer at least one of the one or more rendering commands. The command buffer may be implemented via the graphics hardware module and configured to receive the at least one of the one or more rendering commands and provide the at least one of the one or more rendering commands for the graphics rendering. The power management unit may be implemented via the graphics hardware module and configured to receive the one or more graphics rendering performance characteristics and provide the one or more graphics rendering performance characteristics for the graphics rendering. The render context module may be configured to receive the context based performance level and to store the context based performance level in a render context The render context may be associated with the graphics context and the graphics client. The scheduler module may be configured to determine whether the context based performance level is different than a current context based performance level and if the context based performance level is different than the current context based performance level, transfer the context based performance level to the power management module and if the context based performance level is not different than the current context based performance level, take no action. The rendering module may be implemented via the graphics hardware module and configured to perform the graphic rendering. The scheduler module may be further configured to determine a change from a current graphics client to the graphics client associated with one or more rendering commands and transfer the context based performance level from the render context module to the power management module in response to the change. Transferring the context based performance level may include transferring the context based performance level as part of the render context. The power management module may be further configured to determine one or more graphics rendering performance characteristics based at least in part on evaluating the one or more rendering commands based on a heuristic algorithm. Determining the one or more graphics rendering performance characteristics may further include activating one or more governors implemented via the power module and associated with the context based performance level. The one or more governors may include a performance governor, a hardware governor, or a power governor. The performance governor may be configured to receive performance targets. The power governor may be configured to receive a power budget. The context based performance level may include at least one of a strict performance level or an elastic performance level. The graphics context may include the graphics client, such that the graphics client may include a graphics application or a virtual machine, one or more applications running on the device, one or more virtual machines running on the device, a graphics requirement of the graphics client, an indication of whether the graphics client is running on a foreground or a background of the device, a user-selected power consumption setting, or a security status of the graphics client. The graphics context may include a first virtual machine running a hypertext markup language 5 (HTML5) browser, a second virtual machine comprises a coding application such that, if the first virtual machine is in the foreground, the context based performance level may be the strict performance level and, if the first virtual machine is in the background, the context based performance level may be the elastic performance level. The one or more graphics rendering performance characteristics may include at least one of an operating frequency, an idle state, or graphics operation information. The context aware agent may include a component of a graphics stack, a user mode driver, an operating system window manager, or a virtual machine display manager. The command dispatch module, the render context module, the power management module, and the scheduler module may be implemented via a graphics driver. The graphics driver may be implemented via the one or more processors. The graphics hardware module may include a graphics processing unit, a graphics device, or a field programmable gate array.

In a further example, at least one machine readable medium may include a plurality of instructions that in response to being executed on a computing device, cause the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for managing power in a device comprising:
   generating, at a graphics client, one or more rendering commands;
   generating, at a context aware agent of the device, a context-based performance level based at least in part on a graphics context, wherein the context-based performance level alternates between a non-power saving strict performance level and a power saving elastic performance level;
   determining, at a power management module of the device, one or more graphics rendering performance characteristics based at least in part on the context-based performance level, wherein determining the one or more graphics rendering performance characteristics further comprises evaluating the one or more rendering commands based on a heuristic algorithm, wherein determining o the one or more graphics rendering performance characteristics is based on one or more of activating a power governor at the power saving elastic performance level, and activating a performance governor at the non-power saving strict performance level;
   performing, at a graphics hardware module of the device, a graphics rendering based at least in part on at least one of the one or more rendering commands as well as on the one or more graphics rendering performance characteristics; and
   transferring the one or more rendering commands from the graphics client to a command dispatch module of the device;
   determining a change from a current graphics client to the graphics client associated with one or more rendering commands;
   transferring the context-based performance level from the render context module to the power management module in response to the change, wherein transferring the context-based performance level comprises transferring the context-based performance level as part of the render context.

2. The method of claim 1, wherein the graphics context comprises a graphics client and wherein the graphics client comprises at least one of a graphics application or a virtual machine.

3. The method of claim 1, wherein the graphics context comprises a graphics requirement of a graphics client.

4. The method of claim 1, wherein the graphics context comprises at least one of an indication of whether a graphics client is running on a foreground or a background of the device.

5. The method of claim 1, wherein the graphics context comprises a user-selected power consumption setting.

6. The method of claim 1, wherein the graphics context comprises a security status of an application or a virtual machine running on the device.

7. The method of claim 1, wherein the one or more graphics rendering performance characteristics comprise at least one of an operating frequency, an idle state, or guidance information.

8. The method of claim 1, further comprising:
   transferring the context-based performance level from the context aware agent to a render context module of the device;
   storing, via the render context module, the context-based performance level in a render context, wherein the render context is associated with a graphics client;
   determining the context-based performance level is different than a current context-based performance level via the power management module of the device and determining the one or more graphics rendering performance characteristics in response to the context-based performance level being different than the current context-based performance level.

9. The method of claim 1, wherein determining the one or more graphics rendering performance characteristics further comprises activating one or more governors associated with the context-based performance level, wherein the one or more governors comprise at least one of the performance governor, a hardware governor, or the power governor, wherein the performance governor receives performance targets, and wherein the power governor receives a power budget.

10. The method of claim 1, further comprising:
    transferring at least one of the one or more rendering commands from the command dispatch module to a command buffer of the graphics hardware module; and
    transferring the one or more graphics rendering performance characteristics from the power management module to a power management unit of the graphics hardware module; wherein evaluating the one or more rendering commands is performed via the power management module.

11. The method of claim 1, further comprising:
    transferring the context-based performance level from the context aware agent to a render context module of the device;
    storing, via the render context module, the context-based performance level in a render context, wherein the render context is associated with a graphics client;
    determining the context-based performance level is different than a current context-based performance level via the power management module of the device and determining the one or more graphics rendering performance characteristics in response to the context-based performance level being different than the current context-based performance level;
    determining the context-based performance level is not different than a current context-based performance level via the power management module of the device and taking no action in response to the context-based performance level not being different than the current context-based performance level;

transferring the one or more rendering commands from the graphics client to a command dispatch module of the device;

determining a change from a current graphics client to the graphics client associated with one or more rendering commands;

transferring the context-based performance level from the render context module to the power management module in response to the change, wherein transferring the context-based performance level comprises transferring the context-based performance level as part of the render context;

transferring at least one of the one or more rendering commands from the command dispatch module to a command buffer of the graphics hardware module; and transferring the one or more graphics rendering performance characteristics from the power management module to a power management unit of the graphics hardware module;

wherein determining the one or more graphics rendering performance characteristics further comprises activating one or more governors associated with the context-based performance level, wherein the one or more governors comprise at least one of the performance governor, a hardware governor, or the power governor, wherein the performance governor receives performance targets, and wherein the power governor receives a power budget, wherein the context-based performance level comprises at least one of a strict performance level or an elastic performance level, wherein the graphics context comprises at least one of the graphics client, wherein the graphics client comprises at least one of a graphics application or a virtual machine, one or more applications running on the device, one or more virtual machines running on the device, a graphics requirement of the graphics client, an indication of whether the graphics client is running on a foreground or a background of the device, a user-selected power consumption setting, or a security status of the graphics client, and wherein the graphics context comprises a first virtual machine running a hypertext markup language 5 (HTML5) browser, a second virtual machine comprises a coding application and wherein, if the first virtual machine is in the foreground, the context-based performance level is the strict performance level and, if the first virtual machine is in the background, the context-based performance level is the elastic performance level, wherein the one or more graphics rendering performance characteristics comprise at least one of an operating frequency, an idle state, or guidance information, wherein the context aware agent comprises at least one of a component of a graphics stack, a user mode driver, an operating system window manager, or a virtual machine display manager, wherein the command dispatch module, the render context module, the power management module, and the scheduler module are implemented via a graphics driver, and wherein the graphics hardware module comprises at least one of a graphics processing unit or a field programmable gate array.

12. A system for managing power in a device, comprising:
a display device configured to present image data; one or more processors communicatively coupled to the display device;
one or more memory stores communicatively coupled to the one or more processors;
a graphics cent configured to generate one or more rendering commands;
a context aware agent configured to generate a context-based performance level based at least in part on a graphics context of the device, wherein the context-based performance level alternates between a non-power saving strict performance level and a power saving elastic performance level;
a power management module configured to determine one or more graphics rendering performance characteristics based at least in part on the context-based performance level, wherein determination of the one or more graphics rendering performance characteristics further comprises evaluating the one or more rendering commands based on a heuristic algorithm, wherein determining of the one or more graphics rendering performance characteristics is based on one or more activating a power governor at the power saving elastic performance level, and activating a performance governor at the non-power saving strict performance level;
a graphics hardware module configured to perform a graphics rendering based at least in part on at least one of the one or more rendering commands as well as on the one or more graphics rendering performance characteristics,
wherein the presentment of image data via the display device is based at least in part on the graphics rendering; and
transferring the one or more rendering commands from the graphic client to a command dispatch module of the device;
determining a change from a current graphics client to the graphics client associated with one or more rendering commands;
transferring the context-based performance level from the render context module to the power management module in response to the change, wherein transferring the context-based performance level comprises transferring the context-based performance level as part of the context.

13. The system of claim 12, wherein the graphics context comprises a graphics requirement of a graphics client.

14. The system of claim 12, wherein the graphics context comprises a user-selected power consumption setting.

15. The system of claim 12, wherein the graphics context comprises a security status of an application or a virtual machine running on the device.

16. The system of claim 12, wherein the one or more graphics rendering performance characteristics comprise at least one of an operating frequency, an idle state, or guidance information.

17. The system of claim 12, further comprising a command dispatch module, a render context module, the power management module, and the scheduler module implemented via a graphics driver, wherein the graphics driver is implemented via the one or more processors, and wherein the graphics hardware module comprises at least one of a graphics processing unit, a graphics device, or a field programmable gate array.

18. The system of claim 12, further comprising:
a command dispatch module configured to receive the one or more rendering commands and transfer at least one of the one or more rendering commands;
a command buffer implemented via the graphics hardware module and configured to receive the at least one of the one or more rendering commands and provide the at least one of the one or more rendering commands for the graphics rendering;
a power management unit implemented via the graphics hardware module and configured to receive the one or more graphics rendering performance characteristics and provide the one or more graphics rendering performance characteristics for the graphics rendering; and
a rendering module implemented via the graphics hardware module and configured to perform the graphic rendering.

19. The system of claim 12, further comprising:
a command dispatch module configured to receive the one or more rendering commands and transfer at least one of the one or more rendering commands;
a command buffer implemented via the graphics hardware module and configured to receive the at least one of the one or more rendering commands and provide the at least one of the one or more rendering commands for the graphics rendering;
a power management unit implemented via the graphics hardware module and configured to receive the one or more graphics rendering performance characteristics and provide the one or more graphics rendering performance characteristics for the graphics rendering; and
a render context module configured to receive the context-based performance level and to store the context-based performance level in a render context, wherein the render context is associated with the graphics client;
a scheduler module configured to determine a change from a current graphics client to the graphics client associated with one or more rendering commands and transfer the context-based performance level from the render context module to the power management module in response to the change, wherein transferring the context-based performance level comprises transferring the context-based performance level as part of the render context;
a rendering module implemented via the graphics hardware module and configured to perform the graphic rendering;
wherein the power management module is further configured to determine the context-based performance level is different than a current context-based performance level via the power management module of the device and determine the one or more graphics rendering performance characteristics in response to the context-based performance level being different than the current context-based performance level, and to determine the context-based performance level is not different than a current context-based performance level via the power management module of the device and take no action in response to the context-based performance level not being different than the current context-based performance level;
wherein determining the one or more graphics rendering performance characteristics further comprises activating one or more governors implemented via the power module and associated with the context-based performance level, wherein the one or more governors comprise at least one of the performance governor, a hardware governor, or the power governor, wherein the performance governor is configured to receive performance targets, and wherein the power governor is configured to receive a power budget, wherein the context-based performance level comprises at least one of a strict performance level or an elastic performance level,
wherein the graphics context comprises at least one of the graphics client, wherein the graphics client comprises at least one of a graphics application or a virtual machine, one or more applications running on the device, one or more virtual machines running on the device, a graphics requirement of the graphics client, an indication of whether the graphics client is running on a foreground or a background of the device, a user-selected power consumption setting, or a security status of the graphics client, and wherein the graphics context comprises a first virtual machine running a hypertext markup language 5 (HTML5) browser, a second virtual machine comprises a coding application and wherein, if the first virtual machine is in the foreground, the context-based performance level is the strict performance level and, if the first virtual machine is in the background, the context-based performance level is the elastic performance level,
wherein the one or more graphics rendering performance characteristics comprise at least one of an operating frequency, an idle state, or graphics operation information, wherein the context aware agent comprises at least one of a component of a graphics stack, a user mode driver, an operating system window manager, or a virtual machine display manager, wherein the command dispatch module, the render context module, the power management module, and the scheduler module are implemented via a graphics driver, and wherein the graphics driver is implemented via the one or more processors, and
wherein the graphics hardware module comprises at least one of a graphics processing unit, a graphics device, or a field programmable gate array.

20. At least one non-transitory machine-readable medium comprising a plurality of instructions that in response to being executed on a computing device, cause the computing device to manage power in the device by:
generating, at the graphics client, one or more rendering commands;
generating, at a context aware agent of the device, a context-based performance level based at least in part on a graphics context, wherein the context-based performance level alternates between a non-power saving strict performance level and a power saving elastic performance level;
determining, at a power management module of the device, one or more graphics rendering performance characteristics based at least in part on the context-based performance level, wherein determining the one or more graphics rendering performance characteristics further comprises evaluating the one or more rendering commands based on a heuristic algorithm, wherein determining of the one or more graphics rendering performance characteristics is based on one or more of activating a power governor at the power saving elastic performance level, and activating a performance governor at the non-power saving strict performance level;
performing, at a graphics hardware module of the device, a graphics rendering based at least in part on at least one of the one or more rendering commands as well as on the one or more graphics rendering performance characteristics; and transferring the one or more rendering commands from the graphics client to a command dispatch module of the device;
determining a chance from a current graphics client to the graphics client associated with one or more rendering commands;
transferring the context-based performance level from the render context module to the power management module in response to the change, wherein transferring the context-based performance level comprises transferring the context-based performance level as part of the render context.

21. The non-transitory machine-readable medium of claim 20, wherein the graphics context comprises a graphics requirement of a graphics client.

22. The non-transitory machine-readable medium of claim 20, further comprising instructions that in response to being executed on the computing device, cause the computing device to manage power in the device by:
transferring the context-based performance level from the context aware agent to a render context module of the device;
storing, via the render context module, the context-based performance level in a render context, wherein the render context is associated with a graphics client;
determining the context-based performance level is different than a current context-based performance level via the power management module of the device and determining the one or more graphics rendering performance characteristics in response to the context-based performance level being different than the current context-based performance level;
determining the context-based performance level is not different than a current context-based performance level via the power management module of the device and taking no action in response to the context-based performance level not being different than the current context-based performance level;
transferring the one or more rendering commands from the graphics client to a command dispatch module of the device;
determining a change from a current graphics client to the graphics client associated with one or more rendering commands;
transferring the context-based performance level from the render context module to the power management module in response to the change, wherein transferring the context-based performance level comprises transferring the context-based performance level as part of the render context;
transferring at least one of the one or more rendering commands from the command dispatch module to a command buffer of the graphics hardware module; and
transferring the one or more graphics rendering performance characteristics from the power management module to a power management unit of the graphics hardware module; wherein evaluating the one or more rendering commands is performed via the power management module,
wherein determining the one or more graphics rendering performance characteristics further comprises activating one or more governors associated with the context-based performance level, wherein the one or more governors comprise at least one of the performance governor, a hardware governor, or the power governor, wherein the performance governor receives performance targets, and wherein the power governor receives a power budget,
wherein the context-based performance level comprises at least one of a strict performance level or an elastic performance level,
wherein the graphics context comprises at least one of the graphics client, wherein the graphics client comprises at least one of a graphics application or a virtual machine, one or more applications running on the device, one or more virtual machines running on the device, a graphics requirement of the graphics client, an indication of whether the graphics client is running on a foreground or a background of the device, a user-selected power consumption setting, or a security status of the graphics client, and wherein the graphics context comprises a first virtual machine running a hypertext markup language 5 (HTML5) browser, a second virtual machine comprises a coding application and wherein, if the first virtual machine is in the foreground, the context-based performance level is the strict performance level and, if the first virtual machine is in the background, the context-based performance level is the elastic performance level,
wherein the one or more graphics rendering performance characteristics comprise at least one of an operating frequency, an idle state, or guidance information, wherein the context aware agent comprises at least one of a component of a graphics stack, a user mode driver, an operating system window manager, or a virtual machine display manager,
wherein the command dispatch module, the render context module, the power management module, and the scheduler module are implemented via a graphics driver, and wherein the graphics hardware module comprises at least one of a graphics processing unit or a field programmable gate array.

* * * * *